July 23, 1935.   C. V. HILDEBRECHT   2,008,758
THERMOSTATICALLY CONTROLLED REGULATOR
Filed Feb. 23, 1932   2 Sheets-Sheet 2
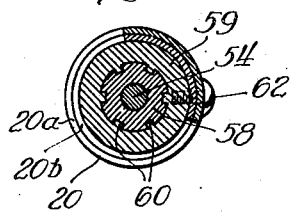
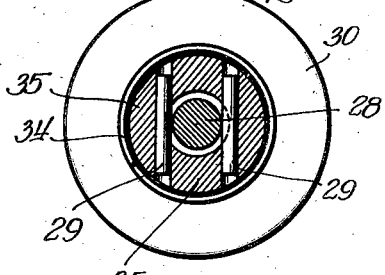
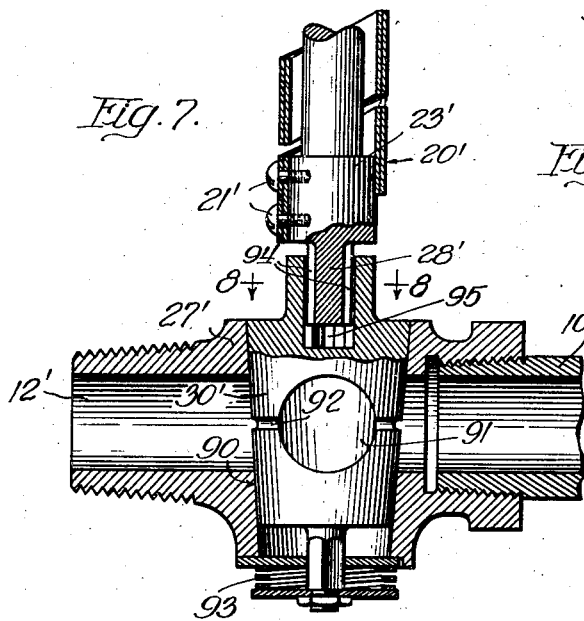
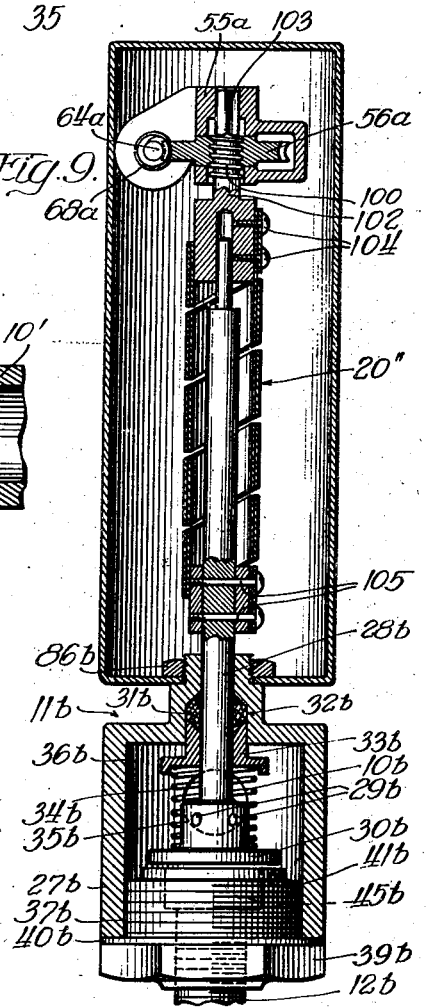
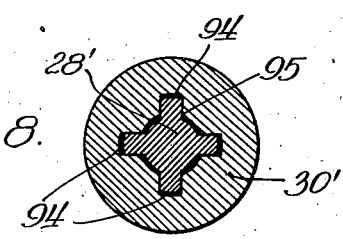
Inventor
Charles V. Hildebrecht
By Brown, Jackson, Boettcher + Dienner
Attys.

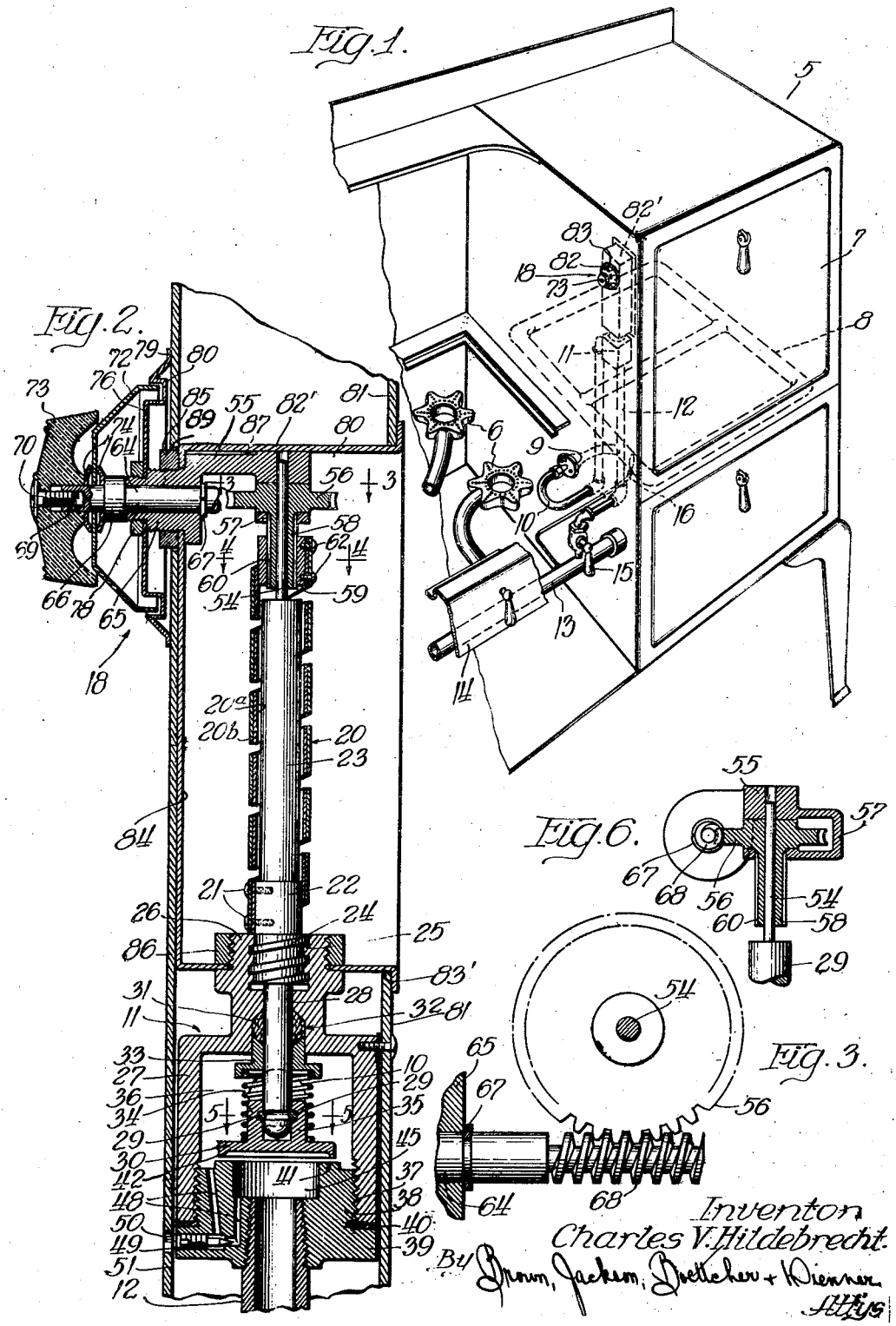

Patented July 23, 1935

2,008,758

UNITED STATES PATENT OFFICE 2,008,758

THERMOSTATICALLY CONTROLLED REGULATOR

Charles V. Hildebrecht, Chicago, Ill., assignor to Milwaukee Gas Specialty Company, Milwaukee, Wis., a corporation of Wisconsin Application February 23, 1932, Serial No. 594,432

6 Claims. (Cl. 236—15)

This invention relates to thermostatically controlled regulators.

The particular device which I shall describe hereinafter, in connection with the drawings, is a thermostatically controlled heat regulator for ovens, and the like, particularly for ovens as embodied in modern domestic ranges. It is to be understood, however, that the invention is not limited to this particular use, but may be employed as suitable and desired.

Heat regulators of the general type to which my invention relates comprise a control device for controlling the heating medium, a selecting device for setting the control device for particular temperatures, and a thermally operated device operated automatically with temperature changes to maintain substantially the selected temperatures.

The particular thermally operated device of the present invention comprises a bi-metallic element made in the form of a helix to secure maximum length in a relatively small space, and maximum expansion and contraction. The helical form of the thermally operated device provides a comparatively simple, inexpensive, and positive control, and a control adapted to produce relatively large movements with relatively small changes in temperature.

The expansion and contraction of the thermally operated device is transmitted through a suitable connection to the control device to operate this device to maintain the selected temperature. If the temperature within the oven, or other space or chamber, tends to rise above that for which the selecting device is set, the thermally operated device will operate the control device to reduce the increased temperature, and if the temperature tends to drop below that for which the selecting device is set, the thermally operated device will operate to increase the reduced temperature.

My present invention is adapted for use with the rotatable plug, as well as with the poppet type of control valve, and I have illustrated and shall describe herein both such embodiments. In the case of the rotatable plug type of valve, the rotational or turning action of the bi-metallic strip is adapted to turn the valve directly to increase or reduce the heat, depending upon whether the temperature is tending to rise above or drop below that preselected by the selecting device. In expanding and contracting the bi-metallic strip also tends to elongate and shorten longitudinally. In the case of the rotatable plug type of valve, I make provision for permitting this without binding of the parts and without interfering with the operation of the device. In the case of the poppet type of valve, this elongation and shortening longitudinally may be used to move the valve toward and away from its seat, or the rotational or turning action of the strip may be utilized for operating this type of valve, and in such case provision is again made for permitting this longitudinal elongation and shortening without binding or interfering with the operation of the device.

If desired, a movement changing connection may be employed between the control device and the adjacent end of the bi-metallic element. Such a connection may provide, for example, a greater or less movement in the control device than actually occurs in the bi-metallic element, or it may provide a different movement such, for example, as a rectilineal movement in the control device by means of a turning action in the thermally operated device, or movement in the control device in a different direction than that in the adjacent end of the bi-metallic element.

The invention is illustrated in the accompanying drawings, in which:

Figure 1 is a fragmentary perspective view of a domestic gas range, showing an embodiment of my present invention in connection therewith;

Figure 2 is a more or less schematic vertical section, partially in elevation, and showing the control device, the thermally operated device and the selecting means;

Figure 3 is a horizontal section taken on the line 3—3 of Figure 2;

Figure 4 is a detail section taken on the line 4—4 of Figure 2;

Figure 5 is a detail section taken on the line 5—5 of Figure 2;

Figure 6 is a detail sectional view of the worm wheel and adjacent housing;

Figure 7 is a view similar to Figure 2, showing another embodiment of the invention;

Figure 8 is a detail section taken on line 8—8 of Figure 7; and

Figure 9 is a view similar to Figure 2, showing another embodiment of the invention.

In the drawings, the gas range 5 is illustrative of a modern domestic range, and it is provided with the open top burners 6 and with the oven 7.

The oven 7 is provided with the usual oven burner indicated in dotted lines at 8, and this burner is connected by means of the usual mixing tube 9, conduit 10, the valve housing 11 of the control device, and conduit 12, with the gas supply manifold indicated at 13. This gas supply manifold 13 extends along the front of the control panel 14 of the range, and serves to supply fuel for both the open top burners 6 and the oven burner 8. The supply of gas from the manifold 13 to the conduit 12 is adapted for hand control by a valve 15, which may be of conventional or other form, and this valve is adapted to open and close the gas supply to the burner 8. A pilot lighter for the oven burner 8 is indicated more or less diagrammatically at 16.

The regulator of Figures 1 to 6, inclusive, consists of the controlling device 11, a selecting device 18, and a thermally operated device 20.

The thermally operated device 20 consists of a bi-metallic strip made in the form of a helix and comprising an inner metal strip 20a and an outer metal strip 20b having a coefficient of expansion different from that of the inner strip. The two metals are soldered or brazed together, and at its lower end the strip is secured by screws 21 to the enlarged lower portion 22 of the upright post 23.

Below the enlargement 22 the post 23 has an external thread 24 of square form which engages in an internal thread 25 of similar form in the upper boss-like part 26 of the valve body 27. Below the threaded part 24 the post 23 has an integral reduced valve stem 28 which extends down and has fixed upon its lower end at 29 a valve disc 30. The stem 28 is sealed by packing 31 in a recess 32 provided with a gland 33, and a coiled spring 34 surrounds the lower end of the stem 28 and the boss 35, and is interposed between the valve disc 30 and the flange at the lower end of the gland member 33, which flange is recessed to provide suitable lateral retention for the adjacent end of the spring 34.

The valve body 27 is in the form of a valve housing having an outlet chamber 36, which outlet chamber is connected to the upper end of the conduit 10. Threaded at 37 into the lower end of the valve body 27 is a plug member 38, the periphery of the enlarged flange 39 of which may be of hexagonal or other form for engagement by a wrench or other suitable tool. A packing ring 40 is interposed between the flange 39 and the adjacent end of the valve body 27.

The upper end of the plug member 38 is finished off to form a seat 41 for the annular seating lip 42 of the valve disc 30. Below the seat 41 the plug 38 is bored to form an inlet chamber 45, which is connected with the upper end of the pipe 12 leading from the manifold 13.

The plug member 38 is provided with a by-pass 48, which insures that a gas supply sufficient to maintain a flame at the oven burner 8 will be provided whenever the gas cock 15 controlling the flow of gas from the manifold 13 to the valve is opened, and even though the selecting device is in closed position. The effective area of this by-pass is controlled by a suitable metering screw 49, the head of which is disposed adjacent an opening 50 in the outer oven wall 51 so that it may be engaged by a screw driver from outside the oven.

At its upper end the post 23 has a reduced extension 54, which may be journaled, as shown, in the spindle housing 55 of the selecting device. Rotatable freely upon the reduced upper end 54 of the post 23, is a worm wheel 56 positioned and held against vertical displacement between the upper and lower sides of the generally U-shaped worm wheel housing 57 at the inner end of the spindle housing 55. The worm wheel 56 has a depending hub 58, upon which a sleeve 59 is splined at 60 for turning movement with the worm wheel and at the same time having axial movement with respect thereto. The upper end of the helical bi-metallic strip 20 is secured by screws 62 to the sleeve 59.

The selecting device 18 comprises the spindle 64 rotatably journaled in the hub part 65 of the spindle housing 55. The spindle 64 has a flange 66 at the outer side of the hub part 65, and a removable split ring 67 at the inner side of the hub part holds the spindle 64 against axial displacement in the spindle housing. At its inner end the spindle 64 has a worm 68 in meshing engagement with the worm wheel 56, and the outer end of the spindle is recessed internally at 69 to receive a screw 70. A dial member 72 has a central opening through which the outer end of the spindle 64 extends, and a control knob 73 fits upon the outer end of the spindle and is secured thereto by the screw 70. A pair of annular washers 74, one between the flange 66 and the inner side of the adjacent portion of the dial member 72, and the other between the hub of the control knob 73 and the opposite side of the dial member. The outer surface of the knob 73 may be knurled, and it is to be noted that the screw 70 may be loosened to release the dial 72, so that it may be turned with respect to the spindle 64 for the purpose of properly positioning the dial with respect to the setting of the control spindle. The screw 70 is then tightened to clamp the dial 72 firmly between the washers 74 and in non-rotatable engagement with the spindle 74.

A bezel member 76 secured centrally upon the spindle housing by a nut member 78 yieldingly engages along its outer periphery 79 with the outer surface of the outer oven wall. The bezel member 76 has a annular depression 80 in which the adjacent edge of the dial member 72 operates, and the dial member is provided with suitable markings 82 (Figure 1) adapted to be brought into register with a fixed point of reference 83 on the bezel member 76 for the purpose of setting the regulator for the desired temperature.

It will now be apparent that by grasping the knob 73 and turning the spindle 64 to register the desired temperature marking on the dial 72 with the point of reference 83, the valve 30 will be unseated an amount sufficient to supply the gas necessary to maintain the selected temperature. The turning of the spindle 64 turns the worm 68 which turns the worm wheel 56. The turning of the worm wheel 56 is transmitted through the splined connection at 60 to the upper end of the bi-metallic strip 20, and the turning movement which is imparted to the strip 20 in this manner is in turn imparted to the post 23 through the connection of the lower end of the bimetallic strip with the post. The turning thus imparted to the post 23 operates through the engagement of the thread 24 in the boss 26 of the valve body to raise or lower the stem 28 and thereby the valve disc 30 to move the same to selected position.

So long as the temperature within the oven remains at that temperature indicated by the selecting device, the bi-metallic strip 20 will permit the valve 30 to remain in selected position, but if the temperature within the oven rises above that for which the device is set, the bi-metallic strip 20 will expand differentially and this differential expansion will rotate one end of the helical strip in a direction to move the valve 30 toward its seat thereby reducing the supply of fuel and lowering the temperature to that for which the device is set. If, on the other hand, the temperature within the oven drops below that for which the regulator is set, the helical bi-metallic strip 20 will contract differentially, and in so doing will set up a rotational action between the opposite ends of the bi-metallic strip in a direction to move the valve 30 from its seat to increase the fuel supply in order to raise the temperature within the oven to that for which the device is set. The splined connection between the collar 59 and the hub 58 of the worm wheel 56 permits the elongation and shortening which accompanies expansion and contraction of the bi-metallic element, and avoids any possible binding of the parts or interference with the operation because of such elongation and shortening. At the same time the supporting of the worm wheel in vertical position in the worm wheel housing 57 at the inner end of the spindle housing 55 permits axial movement of the post 23 with respect to the worm wheel, enabling maintenance of proper meshing engagement of the worm 68 with the worm 56 and at the same time raising and lowering of the post 23 with the action of the thread 24 in the cooperating internal thread in the valve body.

In the embodiment of the invention illustrated in the drawings the bi-metallic element 20 is positioned in a recess 80 between the outer wall 51 and the inner or liner wall 81 of the oven. The recess 80 is formed by a box-like member 82', which may be made of sheet metal and which is set into an opening 83' in the inner wall 81 and suitably secured in place. This box-like member has an outer wall 84 to which the spindle housing 55 is clamped by a nut 85, a bottom wall secured to the boss 26 of the valve body 27 by nut 86 and a top wall 87.

The inner side of the box 82' is open at 88, and the selecting device 18, thermally responsive device 20, and controlling device 11 are all supported by the box 82' and constitute with the box a substantially unitary assembly adapted for installation in a unitary assembled relation by inserting the device through the opening closed by the oven door and into the position shown in Figure 2, with the box in the opening 83' and the spindle housing passing out through the opening 89 to receive the bezel member, dial member, and knob 73 which are applied after positioning the box and supported structure in place.

In the embodiment of Figures 7 and 8 the valve 30' instead of being of the type disclosed in connection with the preceding embodiment, is of the rotatable plug type of generally conical form and seated in a conical bore 90 in the valve body 27'. The inlet side is indicated at 12' and the outlet side at 10', and the valve plug 30' has an opening 91 diametrically therethrough, which is adapted to place the inlet side in communication with the outlet side through different effective portions or areas of the opening 91, depending upon the temperature desired within the oven or other chamber. An annular groove 92 provides a continuous by-pass between the inlet and outlet side, which by-pass is restricted and maintains a supply of fuel to the burner sufficient to maintain the same lighted even when the valve 30' is closed with the opening 91 entirely out of register with the inlet and outlet sides as shown in Figure 7. The valve 30' is held yieldingly seated in the conical bore by a spring 93.

The helical bi-metallic strip is indicated at 20' and is connected by screws 21' to the post 23'. The post 23' has a depending stem 28' which extends down into an axial recess 95 in the upstanding hub of the valve plug 30', and has splined connection at 94 in said recess. In this case the turning action of the lower end of the bi-metallic strip 20' produced by the differential expansion and contraction of the strips of this element under increases and decreases in the temperature above and below that for which the selecting device is set is utilized to turn the valve 30' to increase or reduce the heat. The splined connection at 94 permits the longitudinal elongation and shortening without binding of the parts and without interfering with the operation of the device.

In the embodiment of Figure 9 the valve 30b is similar to the valve 30 of Figure 2, and the other structure and operation is substantially the same as in Figure 2, except that the bi-metallic element 20'' is connected to the valve stem 28b to lift and lower the valve 30b by the longitudinal elongation and shortening of the bi-metallic element instead of by the rotational action of the lower end of that element as in the embodiment of Figure 2. The sealed passage of the stem 28b through the valve body permits the lowering and raising movement of the valve stem and permits also the turning movement which accompanies this elongation and shortening of the thermal sensitive device. As before, the valve 30b is set for any desired temperature from the selecting device (not shown) and through the helical thermal sensitive strip, and when the temperature within the oven or other chamber varies from that for which the regulator is set, the thermal sensitive strip 20b raises or lowers the valve 30b to increase or decrease the fuel supply to the oven burner according to whether the temperature has dropped below or risen above that for which the device is set.

In the embodiment of Figure 9 the selecting spindle is indicated at 64a, and the inner end of this selecting spindle has a worm 68a meshing with the worm wheel 56a. The worm wheel 56a has an internal thread, preferably of square form, in threaded engagement with a corresponding external thread on a pin 102. This pin 102 has an enlarged lower end loosely journaled upon the upper end of the post 28b, and the upper end of the pin is of square or other suitable form, and is held non-rotatably in the spindle housing 55a at 103. The upper end of the helical bi-metallic strip 20b is secured by screw 104 to the enlarged lower end of the pin 102, and the lower end of the helical bi-metallic strip 20b is secured at 105 to the post 28b.

Various adaptations and other arrangements of the device are contemplated. For example, the selecting knob 73 instead of being positioned on the side of the oven adjacent the open top burners 6 may be positioned on the opposite side or at the front of the oven, and the parts may be installed separately instead of in assembled relation as described. Installation from the outside instead of through the inside is also contemplated, and I do not, therefore, intend to be limited to the precise details shown or described.

I claim:

1. In combination, a stove having an oven compartment provided with a side wall, a control valve disposed within said side wall, a helical bi-metallic strip disposed within said side wall and connected to the control valve for operating said control valve automatically with temperature changes to maintain substantially preselected temperatures, and a selecting device extending through the side wall of the of the oven and connected to said helical strip for setting the control valve for preselected temperatures through said strip and from position externally of the side wall of the oven, said control valve being disposed coaxially with respect to said helical bi-metallic strip.

2. In a heat regulator, the combination of a helical bi-metallic strip, a control device disposed coaxially with respect to said strip and having threaded connection with one end of said strip for actuation axially by rotative action of said strip, a selecting device connected with the opposite end of said strip for setting the control device for preselected temperatures through said strip, the connection between said selecting device and said helical strip comprising a worm wheel and an engaging worm, one on the selecting device and the other connected with the adjacent end of the helical strip.

3. In a heat regulator, the combination of a helical bi-betallic strip, a control device connected with and actuated by one end of said strip, a selecting device connected with the opposite end of said strip for setting the control device for preselected temperatures through said strip, the connection between said selecting device and said helical strip comprising a worm wheel having splined connection with the strip, and a worm on said selecting device and meshing with the worm wheel.

4. In a heat regulator, the combination of a valve body, a valve in said valve body, a stem for said valve, a thread on said stem for raising and lowering the valve by turning the stem, and a helical bi-metallic strip connected to turn said stem by rotational action produced in said strip by temperature changes.

5. In a heat regulator, the combination of a selecting device including a worm wheel having a depending hub, a thermally operated device comprising a helical bi-metallic strip and a splined connection between the hub of said worm wheel and the adjacent end of the bi-metallic strip.

6. A permanently assembled structure comprising a box-like member open at one side, a thermally operated device and a control device mounted on said box-like member and constituting with said box-like member a unitary assembly adapted for installation in unitary assembled relation, and a selecting device for said control device.

CHARLES V. HILDEBRECHT.